United States Patent
Tokoi et al.

(10) Patent No.: US 8,659,199 B2
(45) Date of Patent: Feb. 25, 2014

(54) AXIAL GAP PERMANENT MAGNET MOTOR, ROTOR USED FOR THE SAME, AND PRODUCTION METHOD OF THE ROTOR

(75) Inventors: Hirooki Tokoi, Hitachi (JP); Yuji Enomoto, Hitachi (JP)

(73) Assignee: Hitachi, Ltd., Tokyo (JP)

(*) Notice: Subject to any disclaimer, the term of this patent is extended or adjusted under 35 U.S.C. 154(b) by 541 days.

(21) Appl. No.: 12/971,034

(22) Filed: Dec. 17, 2010

(65) Prior Publication Data

US 2011/0148224 A1 Jun. 23, 2011

(30) Foreign Application Priority Data

Dec. 18, 2009 (JP) ................. 2009-287270

(51) Int. Cl.
- *H02K 21/12* (2006.01)
- *H02K 1/04* (2006.01)
- *H02K 15/12* (2006.01)

(52) U.S. Cl.
USPC ..... 310/156.12; 310/43; 310/44; 310/156.08; 310/156.46; 310/156.23; 310/156.55; 310/156.15

(58) Field of Classification Search
USPC ............... 310/156.08, 156.46, 156.32, 310/156.12–156.15, 156.23, 43, 44, 156.55
IPC ...................................... H02K 21/12
See application file for complete search history.

(56) References Cited

U.S. PATENT DOCUMENTS

| | | | | |
|---|---|---|---|---|
| 2,060,260 | A * | 11/1936 | Spengler ................. | 310/156.09 |
| 7,535,145 | B2 * | 5/2009 | Murakami ............... | 310/156.08 |
| 8,283,829 | B2 * | 10/2012 | Yamamoto et al. ....... | 310/156.32 |
| 2005/0088052 | A1 * | 4/2005 | Ionel et al. ............... | 310/156.09 |
| 2007/0210663 | A1 * | 9/2007 | Kalavsky et al. ........ | 310/156.19 |
| 2008/0100174 | A1 * | 5/2008 | Stahlhut et al. ............... | 310/268 |
| 2010/0148611 | A1 | 6/2010 | Wang et al. | |
| 2011/0095642 | A1 * | 4/2011 | Enomoto et al. ....... | 310/216.045 |
| 2011/0156519 | A1 * | 6/2011 | Wang et al. ................... | 310/114 |
| 2012/0146445 | A1 * | 6/2012 | Tokoi et al. ............. | 310/156.37 |

FOREIGN PATENT DOCUMENTS

| | | |
|---|---|---|
| JP | 06-038418 | 2/1994 |
| JP | 2001-057753 | 2/2001 |
| JP | 2005-094955 | 4/2005 |
| JP | 2006-050706 | 2/2006 |
| JP | 2008-278590 | 11/2008 |
| JP | 2008-278649 | 11/2008 |

OTHER PUBLICATIONS

Office Action issued in Japanese Patent Application No. 2009-287270 on Jul. 30, 2013.

* cited by examiner

*Primary Examiner* — Tran Nguyen
*Assistant Examiner* — Terrance Kenerly
(74) *Attorney, Agent, or Firm* — Antonelli, Terry, Stout & Kraus, LLP.

(57) ABSTRACT

A stator and a rotor are oppositely arranged having a gap between the stator and the rotor in a direction parallel to a rotary shaft. The rotor has permanent magnets forming field magnetic poles and soft magnetic material segments to cover at least stator-facing surfaces of the respective permanent magnets. Each of the soft magnetic materials forms a composite part together with the permanent magnet. The rotor further has a disc-shaped nonmagnetic molded frame molded so as to cover the periphery of the composite part including the permanent magnet and the soft magnetic material segment while leaving a stator-facing surface of the soft magnetic material segment as an exposed surface. The composite part (including the permanent magnet and the soft magnetic material) and the nonmagnetic molded frame are integrated by molding of the molded material.

14 Claims, 13 Drawing Sheets

AXIAL GAP PERMANENT MAGNET MOTOR, ROTOR USED FOR THE SAME, AND PRODUCTION METHOD OF THE ROTOR

CLAIM OF PRIORITY

The present application claims priority from Japanese application serial No. 2009-287270, filed on Dec. 18, 2009, the contents of which is hereby incorporated by references into this application.

FIELD OF THE INVENTION

The present invention relates to an axial gap permanent magnet motor, a rotor used for the motor, and a production method of the rotor.

BACKGROUND OF THE INVENTION

An axial gap permanent magnet motor basically has a structure in which a stator and a rotor are oppositely arranged via a gap in a direction parallel to a rotary shaft, as disclosed in JP Hei 6-38418A and JP2001-57753A. The stator has multiple stator core segments (including teeth) arranged in a circumferential direction of the motor and coils arranged around the stator core segments. The coils are sequentially energized thereby a rotating magnetic field is generated so as to rotate the rotor.

The rotor has a disc-shaped rotor core formed with soft iron or the like, and approximately fan-shaped permanent magnets (field magnets) with their N and S poles arranged alternately along a rotational direction of the rotor on an end surface of the rotor core in the rotary shaft direction.

As the rotor, as disclosed in JP 2005-94955A and JP2008-278649A, there is a well-known rotor in which a soft magnetic material is provided between permanent magnets and/or on the surfaces of the permanent magnets so as to generate reluctance torque. By providing the soft magnetic material for generation of reluctance torque, the reluctance torque, in addition to the magnet torque by the permanent magnet, can be effectively utilized so as to rotate the rotor.

In JP 2005-94955, regarding the soft magnetic material provided between the permanent magnets, disclosed are of a technique (1) of forming the soft magnetic material with laminated magnetic steels being laminated in a direction orthogonal to the rotary shaft (rotor diameter direction) and a technique (2) of forming the soft magnetic material with a powder magnetic core in place of the laminated magnetic steel. Further, a technique (3) of forming the soft magnetic material covering the surface of the permanent magnet with a powder magnetic core is disclosed. Among these soft magnetic materials, the laminated magnetic steel formed in the rotor diameter direction as in the technique (1) can increase the electric resistance in a direction orthogonal to the magnetic flux of the permanent magnet and suppress the eddy current loss. Further, in a case where the soft magnetic material is formed with a powder magnetic core as disclosed in the techniques (2) and (3), since the powder magnetic core is made by mixing metal magnetic powder (e.g. iron powder) with compound resin and by performing compaction molding and heat treating, the electric resistance is high and the eddy current loss can be effectively suppressed.

Further, JP 2005-94955A discloses a technique of forming an entire rotor core including the above-described soft magnetic material with a powder magnetic core and arranging permanent magnets in the rotor core.

JP2008-278649A discloses a rotor structure where a soft magnetic material of a laminated magnetic steel arranged between permanent magnets as described in the technique (1), a soft magnetic material of powder magnetic core covering the surface of the permanent magnets as described in the technique (3) and the permanent magnets (field magnets) are fixed with a nonmagnetic material holder (fixing frame).

The present invention has been made in consideration of the above situation, and provides an axial gap permanent magnet motor having a rotor assembly integrated structure not disclosed in the conventional techniques to ensure strength with respect to a centrifugal force upon rotation of the rotor and suppress flux leakage for efficient driving.

SUMMARY OF THE INVENTION

The rotor used in the axial gap permanent magnet motor according to the present invention has the following basic structure.

(1) That is, a rotor used for an axial gap permanent magnet motor in which a stator and the rotor are oppositely arranged having a gap between the stator and the rotor in a direction parallel to a rotary shaft, comprises:

a plurality of permanent magnets that are magnetized in a rotary shaft direction respectively and arranged along a circumferential direction of the rotary shaft to form field magnetic poles;

a plurality of soft magnetic material segments each of which is provided so as to cover at least a stator-facing surface in each of the permanent magnets to form a permanent magnet/soft magnetic material composite part including the permanent magnet and the soft magnetic material segment; and a disc-shaped nonmagnetic molded frame that is molded so as to cover a periphery of the permanent magnet/soft magnetic material composite parts while leaving at least the stator-facing surfaces of the soft magnetic material segments as exposed surfaces, wherein the permanent magnet/soft magnetic material composite parts are integrated with the disc-shaped nonmagnetic molded frame by molding of the disc-shaped nonmagnetic molded frame.

Incidentally, assuming that the rotor is formed only with magnets and a powder magnetic core as a rotor core and the powder magnetic core is arranged between the magnets, magnetic flux leaked from a stator-facing surface of the rotor easily returns to the magnet opposite pole side with the powder magnetic core provided between the magnets as a flux path. Accordingly, the magnetic flux of the magnet cannot be efficiently converted to a rotation force and the efficiency is lowered. On the other hand, in the present invention, the nonmagnetic molded frame is provided between the magnets, the above inconvenience can be prevented and the efficiency of the motor rotation can be increased. In the present invention, since the permanent magnet/soft magnetic material composite part (field magnetic elements) can be joined with the nonmagnetic molded frame by a press bonding force by molding, the joint strength between the rotor constituent elements can be increased.

(2) The invention having the above-described basic structure proposes a structure to further increase the joint strength between the rotor constituent elements as follows.

One structure is of the rotor in which side surfaces of each of the soft magnetic material segments are provided with at least one of a projection engaged with the nonmagnetic molded frame or a recessed portion engaged with a part of the nonmagnetic molded frame.

Another structure is of the rotor in which each of the soft magnetic material segments has a side surface steplikely or continuously widening from a side on the stator-facing surface as the exposed surface toward a side opposite to the stator-facing surface.

(3) Further, a cogging torque prevention structure is proposed as follows.

That is, proposed is a structure where the stator-facing surface of each of the soft magnetic material segments has a convex surface toward the stator side.

(4) Further, as a rotor according to the present invention, proposed is of a rotor structure where the permanent magnets, the soft magnetic material segments and the nonmagnetic molded frame are formed with the respective powder materials and integrated by compaction molding of the materials.

(5) Further, proposed is of a structure where the nonmagnetic molded frame is thermoplastic resin or thermohardening resin and the permanent magnet/soft magnetic material composite part is inserted in the resin as an insert molded material.

(6) Further, regarding the above-described rotor, the following production method is proposed:

Using magnet powder as material of the permanent magnets, powder as a powder magnetic core material to be the soft magnetic material segments and resin or ceramic nonmagnetic powder as material of the nonmagnetic molded frame, the method comprises:

a temporarily molding step of separately molding each of the permanent magnets, each of the soft magnetic material segments, and the nonmagnetic molded frame by applying respective compaction molding to the magnet powder, the powder as the powder magnetic core material and the nonmagnetic powder at pressure lower than that in a full-scale molding; and a full-scale molding step of engaging or laminating the temporarily molded permanent magnet and the soft magnetic material segment, and integrating these permanent magnet and soft magnetic material segment with the temporarily molded nonmagnetic molded frame by the full-scale compaction molding.

The rotor structure of the axial gap permanent magnet motor according to the present invention enables efficient motor driving while maintaining the strength upon rotation for the following reasons.

(I) According to the present invention having the above-described basic structure (1), since the permanent magnets and the soft magnetic material segments are integrated by a press bonding force by molding of the nonmagnetic molded frame, the bonding force by molding (bonding strength) is improved. Accordingly, it is possible to provide, in the axial gap permanent magnet motor, a structure to effectively utilize the magnet torque by the magnetic field of the magnet and the reluctance torque by each of the soft magnetic material segments while maintaining the mechanical strength upon rotation of the rotor, thereby achieving efficient driving with suppressed flux loss between the magnets.

(II) According to the above-described structure (2), the anchor effect of engagement of each soft magnetic material segment in the nonmagnetic molded frame or engagement of the nonmagnetic molded frame in the soft magnetic material segment is high or the area of contact between the soft magnetic material segment and the nonmagnetic molded frame becomes large, the bonding force between the rotor parts can be increased.

(III) According to the above-described structure (3), the distortion of wave shape of inductive voltage can be reduced, and the cogging torque can be reduced.

(IV) According to the above-described structures (4) and (5), the bonding strength between the rotor parts can be further increased. Especially, in the integrated mold structure as in the case of the present invention, in comparison with a case where the rotor is produced by individually forming the permanent magnets, the powder magnetic core, the laminated magnetic steel, the fixing frame and the like and assembling these parts, the bonding force (press bonding strength) among the respective parts can be improved. Incidentally, in the conventional techniques, the method of integrating the permanent magnet and the powder magnetic core by molding is disclosed, but a structure to maintain the bonding strength among the other parts is not disclosed.

(V) According to the above-described structure (6), since the rotor elements can be integrally formed, the rotor production method can be simplified.

DETAILED DESCRIPTION OF THE PREFERRED EMBODIMENTS

Hereinbelow, preferred embodiments of the present invention will be described in accordance with the accompanying drawings.

First Embodiment

An axial gap permanent magnet motor according to a first embodiment has a structure where two disc-shaped rotors are oppositely arranged in a motor rotary shaft direction, and a stator is arranged, with a predetermined gap, between the rotors.

(Motor Structure)

Figure 1:
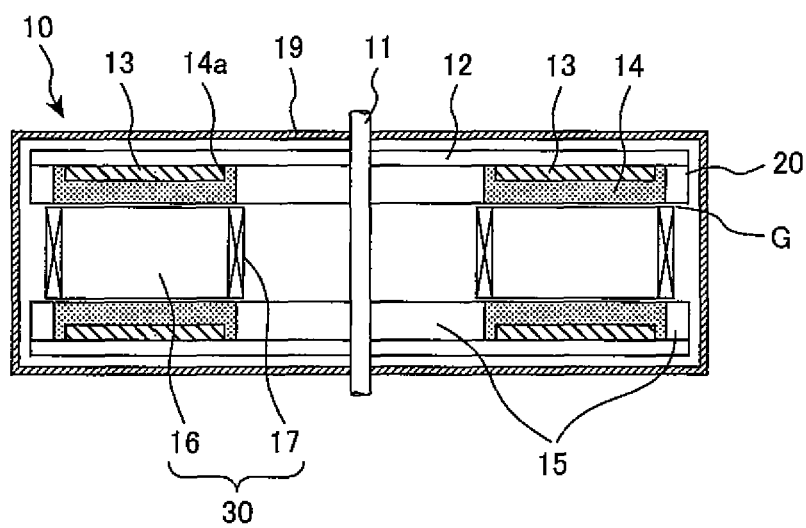
FIG. 1 is a longitudinal sectional view of an axial gap permanent magnet motor according to a first embodiment.

FIG. 1 is a longitudinal sectional view showing an example of the axial gap permanent magnet motor according to the first embodiment. The axial gap permanent magnet motor 10 in the present embodiment has a rotor shaft 11 as a rotary shaft, a disc-shaped rotor 20 fixed to the rotor shaft 11, a stator 30 arranged so as to be opposed to the rotor 20 having a gap G of between the stator 30 and the rotor 20 in a direction parallel to the rotor shaft direction, and a motor case 19 for supporting the rotor shaft 11 via a radial bearing (not shown), covering the stator 30 and the rotor 20 and holding the stator 30.

In the present embodiment, two rotors 20 are fixed to the rotor shaft 11 such that the stator 30 is disposed between the rotors 20 having the gap G between each rotor 20 and the stator 30.

The rotor 20 comprises a disc-shaped rotor yoke 12, a plurality of permanent magnets 13 as field magnetic poles, a plurality of soft magnetic material segments 14 made of soft magnetic material, and a nonmagnetic molded frame (nonmagnetic material) 15.

The stator 30 has a plurality of stator core segments (or teeth) 16 arranged in a rotational direction of the rotor, a plurality of coils 17 arranged around the respective stator cores segments 16, and a nonmagnetic material (not shown) between the coils 17.

Hereinbelow, the structure of the rotor used in the present embodiment will be described.

(Rotor Structure)

Figure 2A:
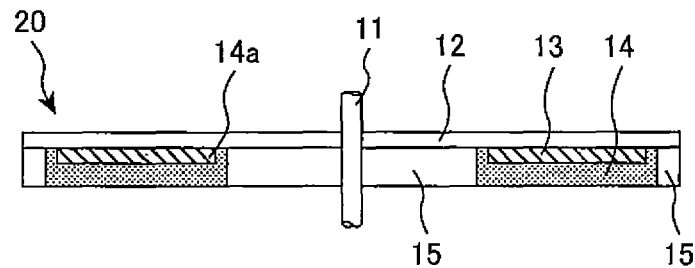
FIG. 2A is a longitudinal sectional view of a rotor in the first embodiment.
Figure 2B:
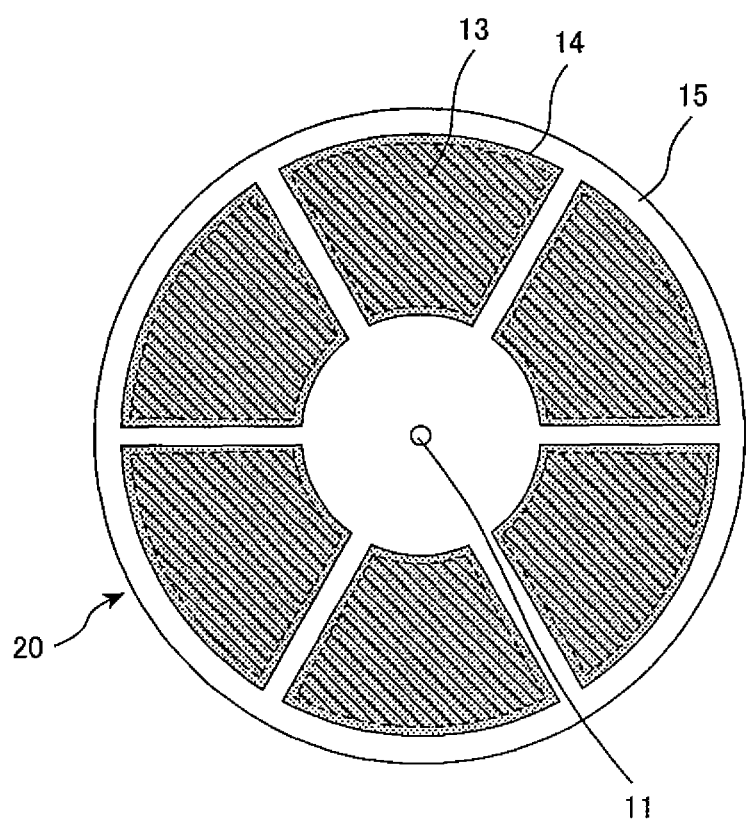
FIG. 2B is a plan view of the rotor in the first embodiment viewing from a lower side.

FIG. 2A is a longitudinal sectional view of the rotor structure in the present embodiment. FIG. 2B is a plan view of the rotor viewing from a lower side.

In FIG. 2A, in the respective rotors 20 having the disc-shaped rotor yoke 12 fixed to the rotor shaft 11, the permanent magnets (field magnetic poles) 13 are arranged at equal intervals along a circumferential direction of the rotor shaft 11 on one surface of each rotor yoke 12. As shown in FIG. 2B, the present example has six permanent magnets (six poles), however, the number of the permanent magnets is not limited to six. Note that regarding the stator 30, the number of coils and the number of stator core segments 16 are nine respectively, however, these numbers thereof are not limited to nine. In FIG. 2B, a hatched region surrounded with a broken line indicates the permanent magnet 13, and a halftone dot region indicates the soft magnetic material segments 14. Actually, each of the permanent magnets 13 is covered with each of the soft magnetic material segments 14, however, it is illustrated as a hatched region for assistance to understanding of the relation of the arrangement.

Each soft magnetic material segment 14 is provided so as to cover a stator-facing surface of each permanent magnet 13, and form a composite part together with the permanent magnet 13. In the present example, the permanent magnet 13 is fixed and embedded in the soft magnetic material segment 14 on one side of the soft magnetic material segment 14 as indicated with reference numeral 14a, thereby the stator-facing surface of the permanent magnet 13 is covered with the soft magnetic material segment 14. The nonmagnetic molded frame 15 is molded in a disc shape so as to cover the periphery of the composite part including the soft magnetic material segment 14 and the permanent magnet 13 while leaving at least the stator-facing surface of the soft magnetic material segment 14 as an exposed surface. The composite part including the soft magnetic material segment 14 and the permanent magnet 13 is integrated with the nonmagnetic molded frame 15 by press bonding by molding of the nonmagnetic molded frame 15. Such integrated rotor assembly is fixed onto one side of the rotor yoke 12 with an arbitrary fixing such as adhesion.

The rotor yoke 12 is made of iron material. Especially, the permanent magnet-facing side thereof is formed with laminated magnetic steels, a powder magnetic core, an electromagnetic SUS or the like so as to suppress eddy current.

The respective permanent magnets 13 are formed in an approximately fan-shaped (segment-shaped) plate and arranged around the rotor shaft 11 as a center in the circumferential direction of the rotor shaft 11 at predetermined intervals.

The permanent magnets 13 are respectively magnetized in the rotor shaft direction i.e. a thickness direction of the permanent magnet, and each of them has N or S magnetic pole on both surfaces thereof. These permanent magnets 13 are arranged such that the N poles and S poles are alternately arranged in the circumferential direction of the rotor shaft 11.

The soft magnetic material segments 14 are respectively formed with a powder magnetic core. As described above, since the powder magnetic core is produced by mixing metal magnetic powder (e.g. iron powder) with compound resin, then doing compaction molding to such a mixture and hardening the mixture by thermohardening, it has high electric resistance and effectively suppresses eddy current loss. The stator-facing surface of each soft magnetic material segment 14 is not covered with the nonmagnetic molded frame 15, thereby the stator-facing surface forms apart of a rotor surface. The nonmagnetic molded frame 15 is made of resin or ceramic material by injection molding, compaction molding or the like so as to be integrated together with the permanent magnets 13 and the soft magnetic material segments 14 by setting the frame 15, magnets 13 and segments 14 within a mold.

(Regarding Rotor Production)

Next, an example of rotor production method according to the present embodiment will be described.

Figure 3A:
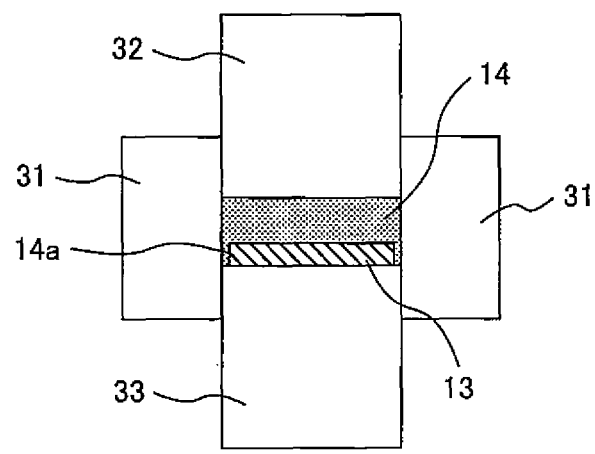
FIG. 3A illustrates a status before a full-scale molding in an example of a rotor production method in the first embodiment.
Figure 3B:
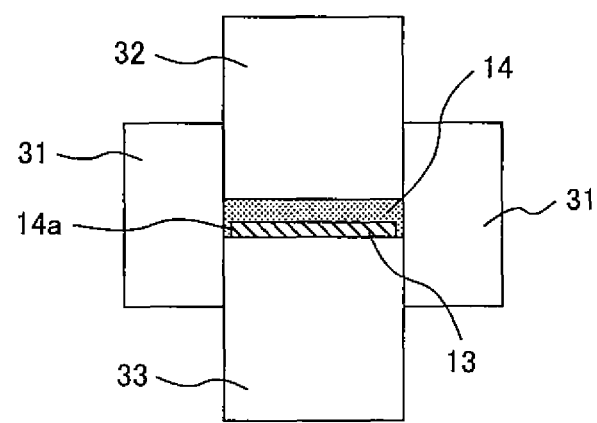
FIG. 3B illustrates a status after the full-scale molding in the example of the rotor production method in the first embodiment.

FIGS. 3A and 3B illustrate statuses before and after a full-scale molding process of the composite part including the permanent magnet 13 and the soft magnetic material segment 14. Prior to the full-scale molding, although not shown, the permanent magnet segment 13 and the soft magnetic material segment 14 are separately temporarily molded with the respective powder material. These temporary moldings are done by compaction molding using a dice, an upper punch die and a lower punch die at pressure lower than that in the full-scale molding. As shown in FIG. 3A, the temporarily molded permanent magnet 13 and soft magnetic material segment 14 are set in a mold for compaction molding having a dice 31, an upper punch die 32 and a lower punch die 33. A recessed portion 14a for embedding the permanent magnet 13 is ensured at one side of the temporarily molded soft magnetic material segment 14. In a status where the permanent magnet 13 is embedded in the recessed portion 14a, approximately equal molding pressure is applied to the upper and lower punch dies 31 and 32 to perform full-scale molding of the composite part (assembly) including the permanent magnet 13 and the soft magnetic material segment 14. FIG. 3B shows the permanent magnet 13 and the soft magnetic material segment 14 in the mold immediately after the full-scale molding.

Further, although not shown, the composite part including the permanent magnet 13 and the soft magnetic material segment 14 obtained by the full-scale molding is placed in a resin mold, thereafter, a resin is supplied in the mold, and the nonmagnetic molded frame 15 is formed by insert molding including the permanent magnet 13 and the soft magnetic material segment 14. As an example of the resin used in the molding, so-called a nanocomposite resin having epoxy resin as a base material can be used. As an example of junction method between the integral structure assembly (of the permanent magnet 13, the soft magnetic material segment 14 and the nonmagnetic molded frame 15 molded as above) and the rotor yoke 12, this two parts can be joined by using an adhesive or the like. As the magnetic powder used in the permanent magnet 13, any one of anisotropic magnetic powder and isotropic magnetic powder can be used. When the anisotropic magnetic powder is used, the production process by compaction molding, e.g., the permanent magnet temporary molding and magnetization orientation are performed in a particular magnetic field corresponding to the anisotropic powder. When the isotropic magnetic powder is used, magnetization can be performed in magnetic field from any direction, and magnetization is performed at the stage of temporary or full-scale molding. A binder such as resin is added to the material powder of the magnet. Since the pressurization condition and heating condition of the compaction molding are not particularly different from those in the existing core molding using powder magnetic core and the magnet molding using magnetic powder, explanations of the conditions will be omitted.

Figure 4A:
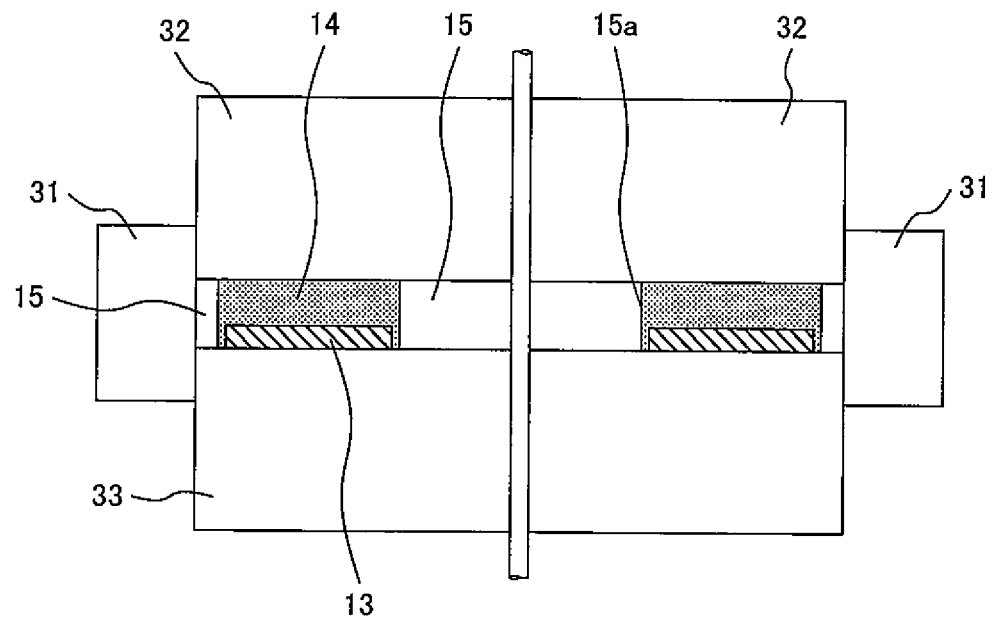
FIG. 4A illustrates a status before a full-scale molding in another example of the rotor production method in the first embodiment.
Figure 4B:
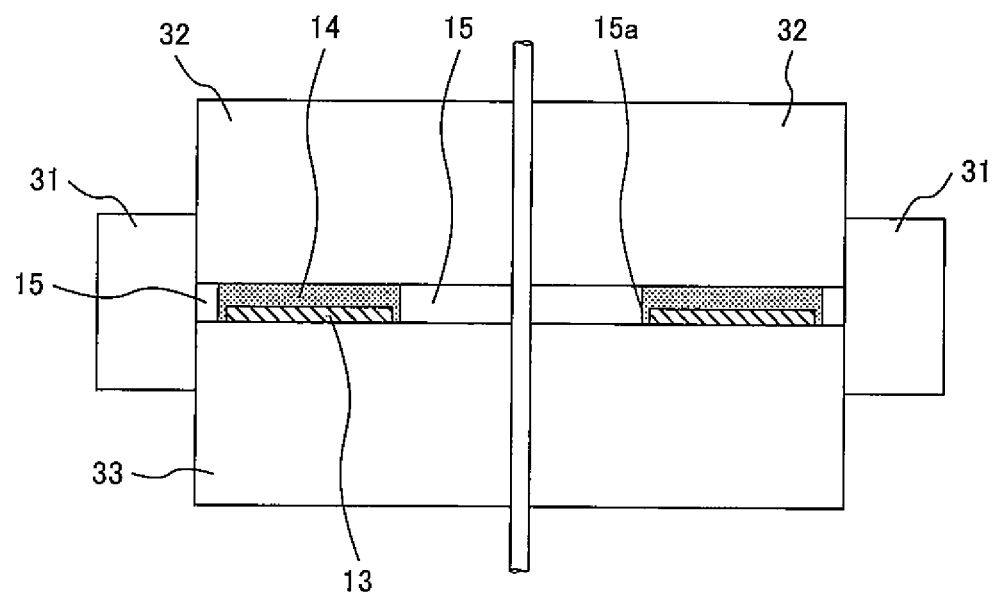
FIG. 4B illustrates a status after the full-scale molding in the rotor production method in FIG. 4A.

FIGS. 4A and 4B show another example of the rotor production method in the first embodiment. FIGS. 4A and 4B show statuses before and after the full-scale molding to integrate the permanent magnet 13, the soft magnetic material segment 14 and the nonmagnetic molded frame 15. Prior to the full-scale molding, the permanent magnet 13, the soft magnetic material segment 14 and the nonmagnetic molded frame 15 are separately temporarily molded respectively with the respective powder materials.

These temporary moldings, also not shown, are done by compaction molding performed using a dice and upper and lower punch dies at pressure lower than that in the full-scale molding. As shown in FIG. 4A, the temporarily molded permanent magnets 13, the soft magnetic material segments 14 and the nonmagnetic molded frame 15 are set in the mold for compaction molding having the dice 31, the upper punch die 32 and the lower punch die 33. In the temporarily molded nonmagnetic molded frame 15, approximately fan shaped holes 15a are ensured for embedding the temporarily molded permanent magnets 13 and the soft magnetic material segments 14 respectively. The permanent magnets 13 and the soft magnetic material segment 14 are embedded in the holes 15a by the set. After that, the permanent magnets 13, the soft magnetic material segments 14 and the nonmagnetic molded frame 15 are set in the mold. In this status, approximately equal molding pressure is applied to the upper and lower punch dies, thereby full-scale molding (compaction molding) is performed.

FIG. 4B shows a status of the permanent magnets 13, the soft magnetic material segments 14 and the nonmagnetic molded frame 15 after the full-scale molding for them. Well-known resin (thermoplastic resin and thermohardening resin are available) or ceramic powder appropriating for molding can be used for the powder material of the nonmagnetic molded frame 15. Further, as the full-scale molding, the insert molding may be performed in place of the compaction molding. As an example of junction method between the integral assembly (including the permanent magnet 13, the soft magnetic material segment 14 and the nonmagnetic molded frame 15 molded as above) and the rotor yoke 12, the two can be joined by using an adhesive or the like.

(Advantages)

In the axial gap axial gap permanent magnet motor according to the present embodiment, the following operations and advantages can be obtained.

In the above-described motor structure, the stator core segments 16 are magnetized in sequence by sequentially passing an electric current through the respective stator coils, thus a rotary magnetic field is formed. Then, the permanent magnet segments 13 of the rotor 20 interact with respect to the rotary magnetic field so as to cause attraction and repulsion operations to rotate the rotor, thus magnet torque can be obtained. At the same time, the soft magnetic material segments 14 on the surface of the permanent magnet 13 at the rotor side are also attracted with the rotary magnetic field, thus reluctance torque can be generated.

In the present embodiment, in the rotor 20, since the permanent magnets 13 and the soft magnetic material segments 14 are integrated by the nonmagnetic molded frame 15 and its press bonding force upon molding (insert molding using resin or compaction molding), the bonding force (bonding strength) is improved between the permanent magnets 13 and the soft magnetic material segments 14. Thereby, a low magnetic resistance between the permanent magnet 13 and the soft magnetic material segment 14 is can be maintained, and the magnetic flux of the permanent magnet 13 on the rotor side can efficiently pass to the stator side. Further, since the bonding strength of the respective parts are high, the strength with respect to the centrifugal force upon rotation can be increased.

(Other Examples of Rotor in the Present Embodiment)

Figure 5A:
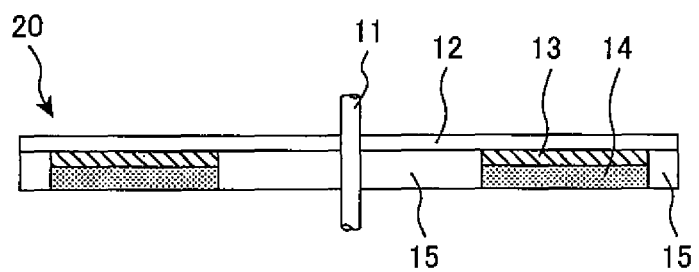
FIG. 5A is a longitudinal sectional view of another example of the rotor in the first embodiment.
Figure 5B:
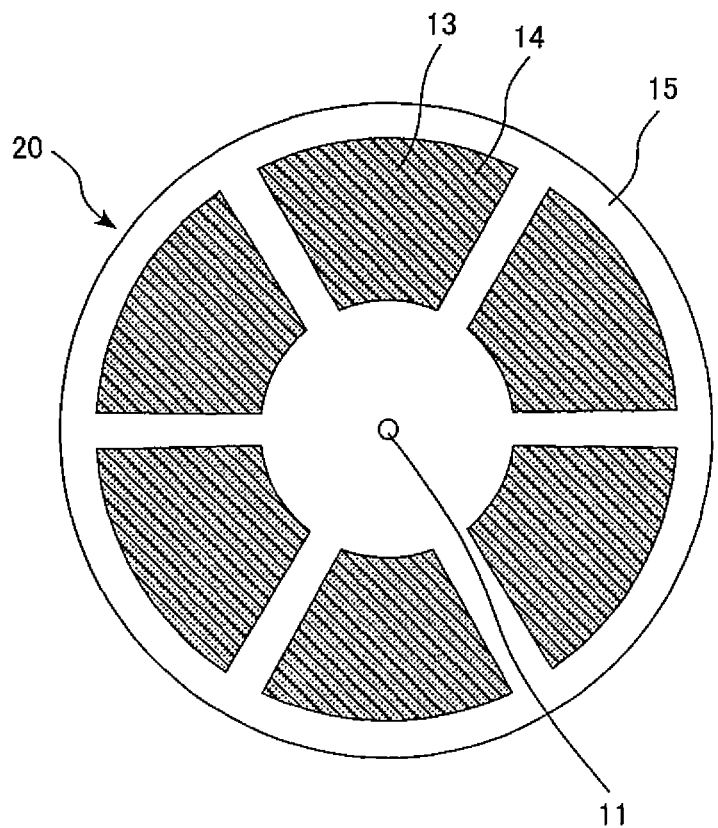
FIG. 5B is a plan view of the rotor in FIG. 5A viewing from the lower side.

FIGS. 5A and 5B show another example of the rotor structure in the present embodiment. FIG. 5A is a longitudinal sectional view of the rotor. FIG. 5B is a plan view of the rotor viewing from the lower side.

The basic structure and production method of the rotor as the present example shown in FIGS. 5A and 5B and those of the rotor shown in FIGS. 2A and 2B are approximately the same. The difference therebetween is that, in the present example, the recess portion 14a (as shown in FIGS. 2A, 3A, and 3B etc.) for embedding the permanent magnet 13 is not formed in each of the soft magnetic material segments 14, and approximately the entire stator-facing surface of the permanent magnet 13 is covered with the soft magnetic material segment 14.

In the above-described structure, the flow of magnetic flux from the stator-facing surface of the rotor side permanent magnet to the rotor yoke can be further suppressed, and the magnetic flux can be directed to the stator side. As a result, the motor efficiency can be improved.

FIGS. 6A to 6D are longitudinal sectional views of other examples of the rotor structure in the axial gap permanent magnet motor according to the present embodiment. The basic structure and production method of the rotors shown in FIGS. 6A to 6D and those of the rotor shown in FIGS. 5A and 5B are approximately the same. The difference therebetween is that the bonding strength between each of the soft magnetic material segments 14 and the nonmagnetic molded frame 15 is further improved with the following structures.

Figure 6A:
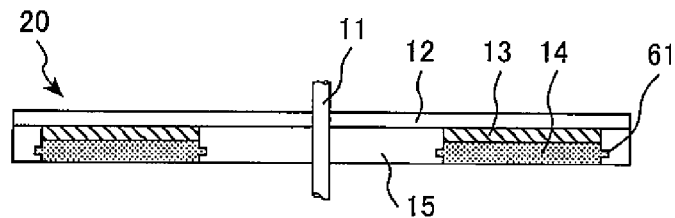
FIG. 6A is a longitudinal sectional view of still another example of the rotor in the first embodiment.

In an example shown in FIG. 6A, a projection 61 e.g. a ring shaped flange, which is engaged with the nonmagnetic molded frame 15, is provided along the circumferential direction of the soft magnetic material segment 14 on a side surface of the soft magnetic material segment 14.

Figure 6B:
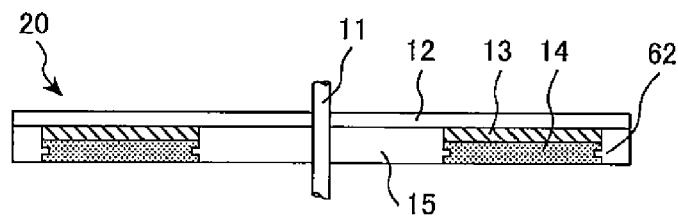
FIG. 6B is a longitudinal sectional view of still another example of the rotor in the first embodiment.

In an example shown in FIG. 6B, a recessed portion 62 e.g. a ring shaped groove, which is engaged with a part of the nonmagnetic molded frame 15, is provided along the circumferential direction of the soft magnetic material segment 14 on the side surface of the soft magnetic material segment 14.

Figure 6C:
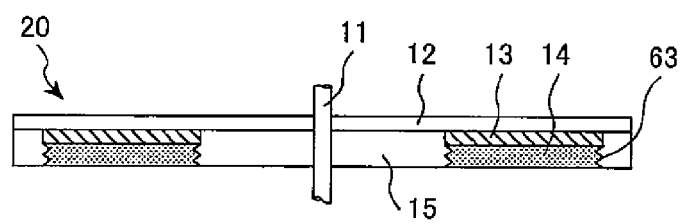
FIG. 6C is a longitudinal sectional view of still another example of the rotor in the first embodiment.

In an example shown in FIG. 6C, a projection and recessed portion 63 e.g. a ring shaped projection and recessed portion, which is engaged with the nonmagnetic molded frame 15, is provided along the circumferential direction of the soft magnetic material segment 14 on the side surface of the soft magnetic material segment 14.

Figure 6D:
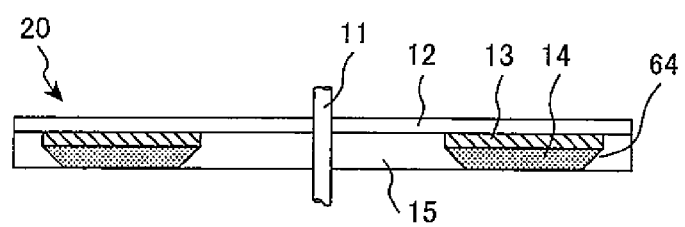
FIG. 6D is a longitudinal sectional view of still another example of the rotor in the first embodiment.

In the embodiment shown in FIG. 6D, the soft magnetic material segment 14 has a side surface 64 with a cross section continuously widening from a side on the stator-facing surface as the exposed surface toward a side opposite to the stator-facing surface. The widening of the side surface 64 may be a steplike shape.

In the above-described structures, an anchor effect and/or a contact area between the soft magnetic material segment 14 and the nonmagnetic molded frame 15 can be increased, and the strength with respect to the centrifugal force upon rotation can be improved.

Figure 7:
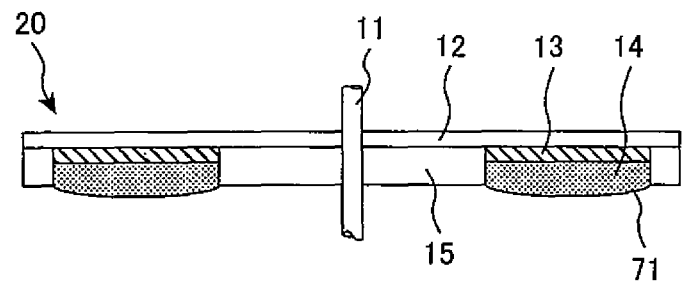
FIG. 7 is a longitudinal sectional view of still another example of the rotor in the first embodiment.

FIG. 7 is a longitudinal sectional view of still another example of the rotor structure in the axial gap permanent magnet motor according to the present embodiment. The basic structure and production method of the rotor shown in FIG. 7 and those of the rotor shown in FIGS. 5A and 5B are approximately the same. The difference therebetween is that cogging torque of this type of motor can be reduced with the following structure.

That is, in the soft magnetic material segment 14 in the present embodiment, the stator-facing surface as the exposed surface has a convex surface 71 toward the stator side.

In the above-described structure, as the stator-facing surface of the soft magnetic material segment 14 is a convexity toward the stator side, the flux density can be reduced at a magnetic pole surface corner where the flux concentration tends to occur, and the magnetic field formed by the permanent magnet 13 in the gap G becomes a sine wave status. Accordingly, the torque waveform since becomes a sine wave, the cogging torque which causes noise or the like can be suppressed.

Note that the axial gap permanent magnet motor in the above embodiment has a 6 pole-9 slot structure where the number of the permanent magnets is six and the number of coils is nine, however, the structure where the number of poles and the number of slots are different from the 6 pole-9 slot structure may be used.

In the motor in the present embodiment, the shape of the permanent magnet 13 is of an approximate fan shape, however, a rhomb shape, a trapezoidal shape or a skewed shape may be used. In such case, the soft magnetic material has a shape corresponding to the magnet shape.

In the motor in the present embodiment, two rotors are arranged such that the stator is disposed therebetween, however, the rotor may exist only one side of the stator. In this case, provided that a soft magnetic material is provided on the surface of the stator not opposite to the rotor, the stator core segments can be magnetically connected with each other.

Second Embodiment

The axial gap permanent magnet motor according to a second embodiment has a pair of stators (two stators) oppositely arranged in the direction parallel to the rotary shaft direction, and a rotor is arranged between the stators having a gap between the rotor and each stator.

(Motor Structure)

Figure 8:
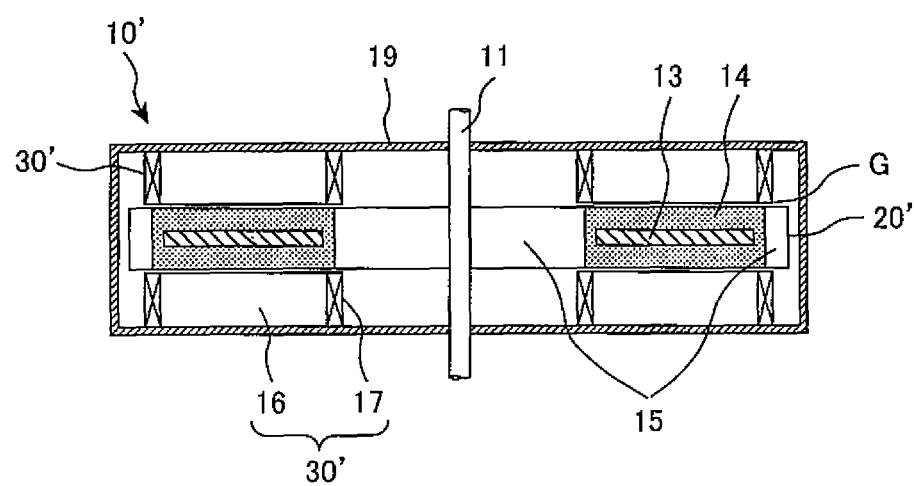
FIG. 8 is a longitudinal sectional view of the axial gap permanent magnet motor according to a second embodiment.

FIG. 8 is a longitudinal sectional view showing an example of the axial gap permanent magnet motor according to the present embodiment. An axial gap permanent magnet motor 10' has the rotor shaft 11, a pair of stators 30' oppositely arranged in the direction parallel to the rotor shaft direction, a disc-shaped rotor 20' fixed to the rotor shaft 11 and arranged between the stators 30' having the gap G of the stator 30' and the rotor 20' and the motor case 19 covering the rotor 20' and the stators 30'. The stator 30' is held with the case 19, and the rotor shaft 11 is rotatably held with the case 19 via a bearing (not shown).

The materials of the component parts of the rotor 20' and the stator 30' in the present embodiment i.e. the permanent magnet 13, the soft magnetic material segment 14, the nonmagnetic molded frame 15, the stator core 16 and the coil (stator coil) 17 are basically the same as those in the first embodiment. In this embodiment, the difference from the first embodiment will be described.

As described above, in the axial gap permanent magnet motor 10' in the present embodiment, since the rotor 20' is arranged between the pair of stators 30' oppositely arranged in the direction parallel to the rotor shaft 11, both surfaces of the rotor 20' are of stator-facing surfaces. The structure of the rotor 20' is as follows.

(Rotor Structure)

Figure 9A:
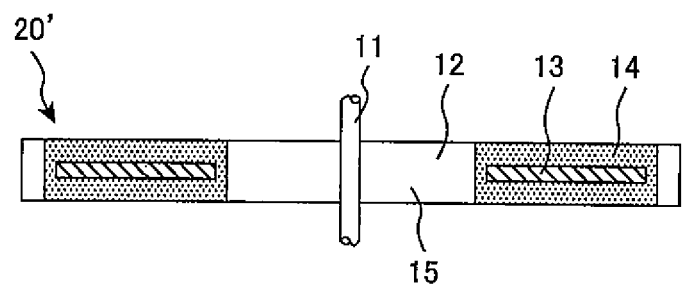
FIG. 9A is a longitudinal sectional view of the rotor in the second embodiment.
Figure 9B:
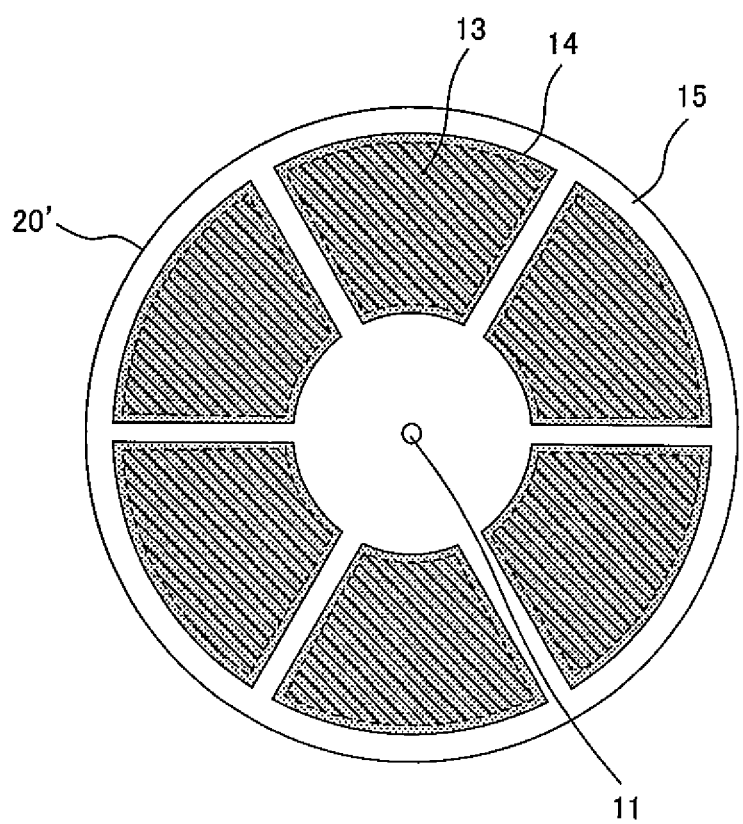
FIG. 9B is a plan view of the rotor in the second embodiment viewing from the lower direction.

FIG. 9A is a longitudinal sectional view of the rotor structure according to a first example of the rotor in the present embodiment. FIG. 9B is a plan view of the rotor viewing from the lower side.

In the rotor 20' in the present embodiment, the entire permanent magnet 13 as each magnetic pole is completely covered with the soft magnetic material segment 14. The nonmagnetic molded frame 15 is molded to have a disc shape so as to cover the periphery of the composite part including the soft magnetic material segment 14 and the permanent magnet 13 while leaving at least the stator-facing surfaces of the soft magnetic material segment 14 i.e. the both surfaces of the soft magnetic material segment 14 as exposed surfaces.

(Regarding Rotor Production)

Figure 10A:
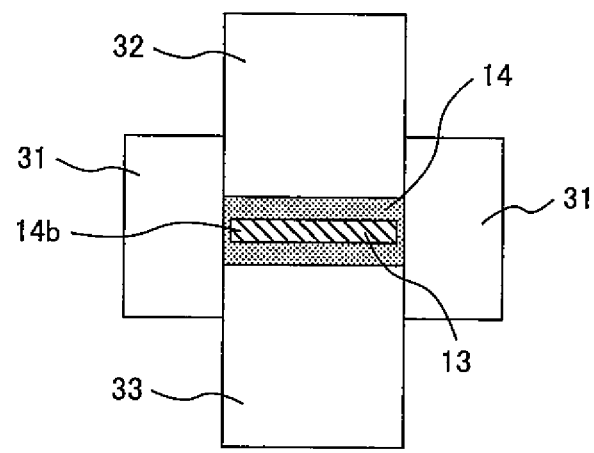
FIG. 10A illustrates a status before the full-scale molding in an example of the rotor production method in the second embodiment.
Figure 10B:
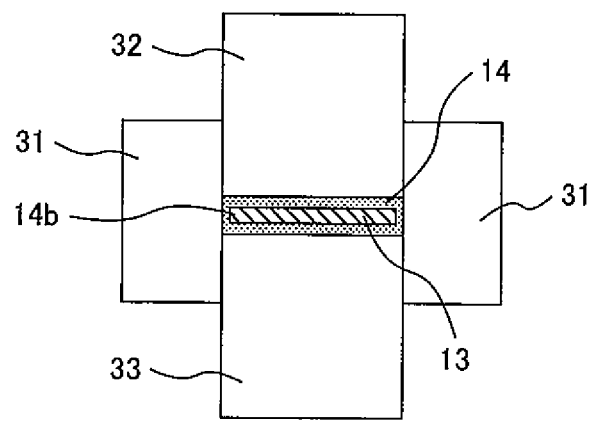
FIG. 10B illustrates a status after the full-scale molding in the example of the rotor production method in the second embodiment.

FIGS. 10A and 10B show, as an example of the rotor production method in the second embodiment, statuses before and after the full-scale molding of the composite part including the permanent magnet 13 and the soft magnetic material segment 14. Prior to this forming process, although not shown, the permanent magnet 13 and the soft magnetic material segment 14 are separately temporarily molded with the respective powder material. This temporary formation is compaction molding performed using a dice, an upper punch die and a lower punch die at pressure lower than that in the compaction molding as described in the first embodiment.

In the temporarily molded soft magnetic material segment 14, an insertion space 14b for embedding the permanent magnet 13 is ensured at a central part. In a status where the permanent magnet 13 is embedded in the insertion space 14b, approximately equal molding pressure is applied to the upper and lower punch dies 31 and 32, to production-mold the composite part (combined part) including the permanent magnet 13 and the soft magnetic material segment 14. FIG. 10B shows the permanent magnet 13 and the soft magnetic material segment 14 in the mold just after the full-scale molding. In the composite part, the both surfaces of the permanent magnet 13 are covered with the soft magnetic material segment 14.

Further, although not shown, the composite parts, each of which comprises the permanent magnet 13 and the soft magnetic material segment 14 and is obtained by the full-scale molding, are set in a mold for resin molding, thereafter, resin is poured in the mold, and the nonmagnetic molded frame 15 is formed by insert molding including the permanent magnets 13 and the soft magnetic material segments 14. As an example of the resin used in the molding, so-called nanocomposite resin having epoxy resin as a base material can be used.

Figure 11A:
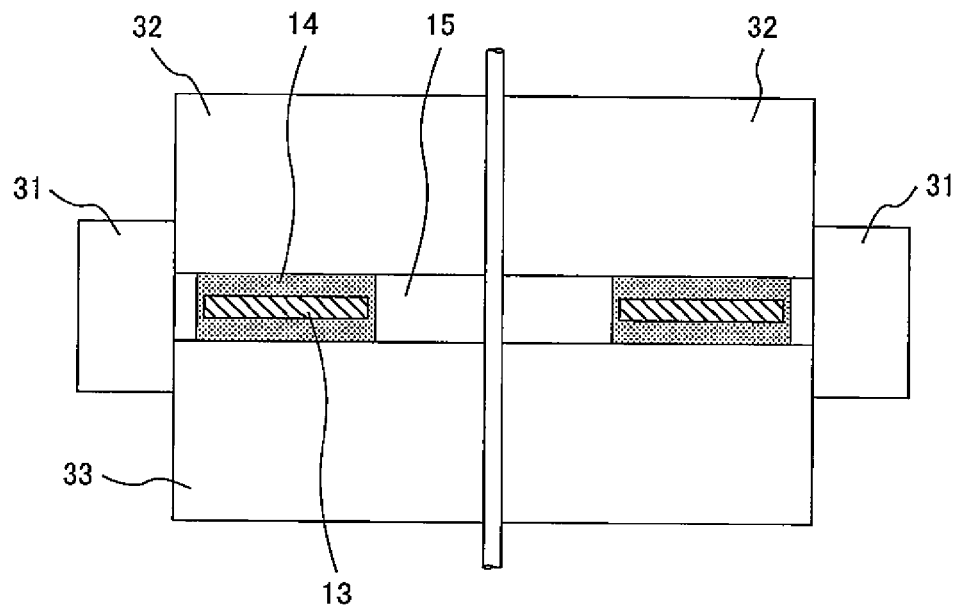
FIG. 11A illustrates a status before the full-scale molding in another example of the rotor production method in the second embodiment.
Figure 11B:
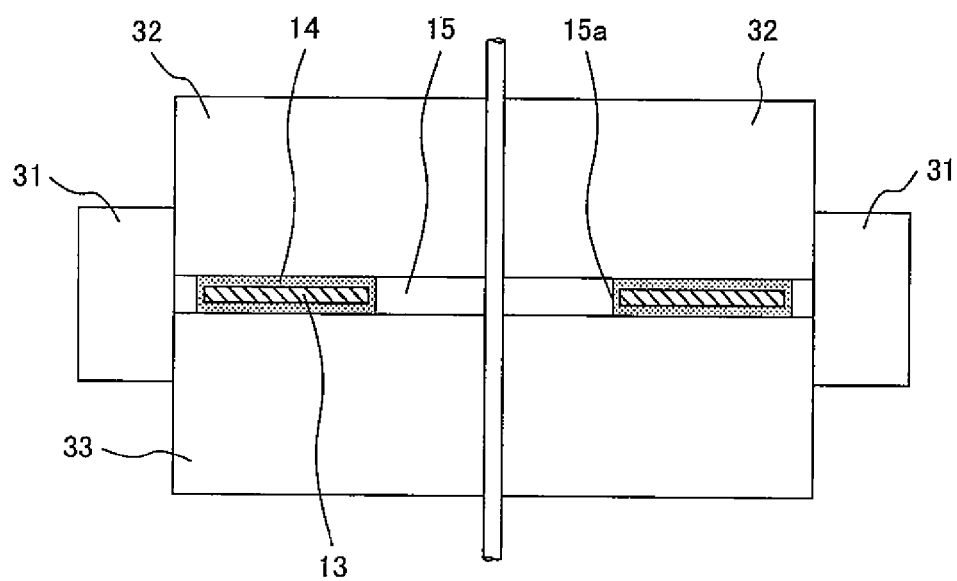
FIG. 11B illustrates a status after the full-scale molding in the rotor production method in FIG. 11A.

FIGS. 11A and 11B show another example of the rotor production method in the second embodiment. FIGS. 11A and 11B show statuses before and after the full-scale molding process to integrate the composite part including the permanent magnet 13 and the soft magnetic material segment 14 and the nonmagnetic molded frame 15. Prior to the full-scale molding, as in the case of the example of production in FIGS. 4A and 4B, each permanent magnet 13, each soft magnetic material segment 14 and the nonmagnetic molded frame 15 are separately temporarily molded (compaction molded) with the respective powder material.

In the temporarily molded nonmagnetic molded frame 15, an approximately fan shaped holes 15a are provided for embedding with the temporarily molded permanent magnet 13 and the soft magnetic material segment 14. Each of the temporarily molded composite parts including the permanent magnet 13 and the soft magnetic material segment 14 is embedded in the hole 15a. In this status, approximately equal molding pressure is applied to the upper and lower punch dies, thereby full-scale molding (compaction molding) is performed.

FIG. 11B shows the status of the permanent magnets 13, the soft magnetic material segments 14 and the nonmagnetic molded frame 15 after the full-scale molding. Note that as the powder material of the nonmagnetic molded frame 15, well-known resin appropriate for molding (thermoplastic resin and thermohardening resin are available) or ceramic powder can be used. Further, as the full-scale molding, the insert molding in place of the compaction molding may be performed.

(Advantages)

According to the structure in the present embodiment, even when the axial gap permanent magnet motor has a rotor between a pair of stators, the same advantages as those described in the first embodiment can be obtained.

Other Embodiments of Rotor

Figure 12A:
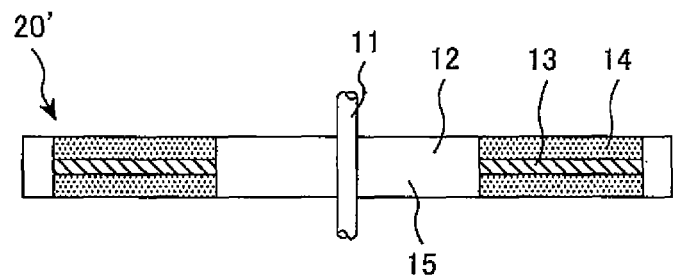
FIG. 12A is a longitudinal sectional view showing still another example of the rotor in the second embodiment.
Figure 12B:
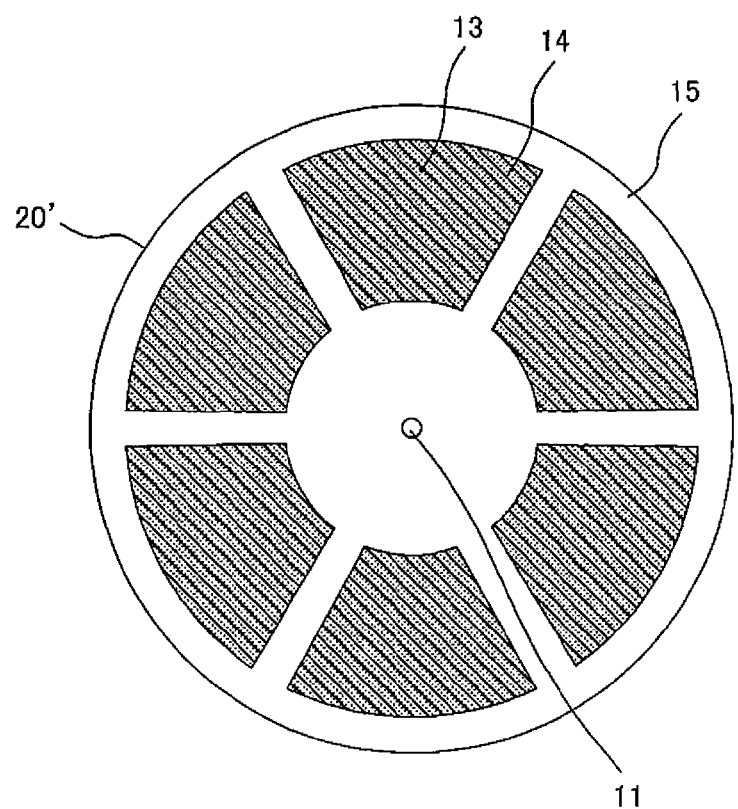
FIG. 12B is a plan view of the rotor in FIG. 12A viewing from the lower direction.
Figure 13A:
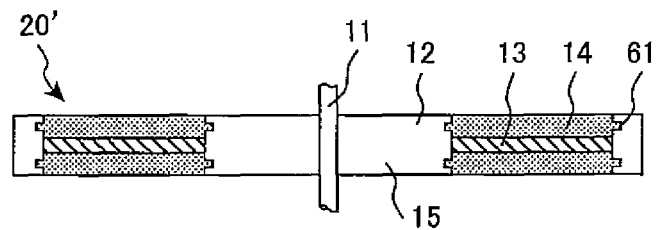
FIG. 13A is a longitudinal sectional view showing still another example of the rotor in the second embodiment.
Figure 13B:
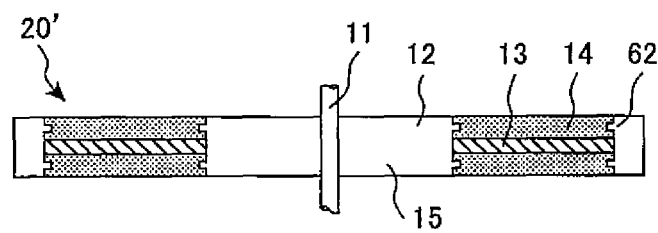
FIG. 13B is a longitudinal sectional view showing still another example of the rotor in the second embodiment.
Figure 13C:
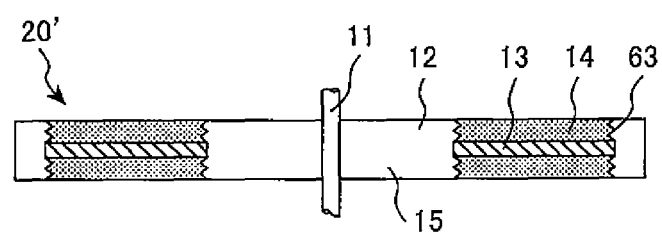
FIG. 13C is a longitudinal sectional view showing still another example of the rotor in the second embodiment.
Figure 13D:
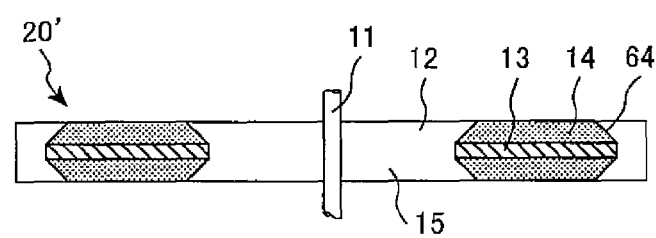
FIG. 13D is a longitudinal sectional view showing still another example of the rotor in the second embodiment.

FIGS. 12A and 12B show still another example of the rotor structure in the present embodiment. FIG. 12A is a longitudinal sectional view of the rotor. FIG. 12B is a plan view of the rotor viewing from the lower side.

The basic structure and production method of the rotor shown in FIGS. 12A and 12B and those of the rotor shown in FIGS. 9A and 9B are approximately the same. The difference between is that in the present embodiment, the rotor has 3-layer structure (sandwich structure) of a soft magnetic material segment 14/permanent magnet 13/soft magnetic material segment 14, so as to cover approximately the entire stator-facing surfaces of the permanent magnet 13 (both surfaces) with the soft magnetic material segment 14.

In the above-described structure, the flow of magnetic flux from the stator-facing surface of the rotor side permanent magnet to the rotor yoke side can be further suppressed, and the magnetic flux can be directed to the stator side. As a result, the motor efficiency can be improved.

In the examples shown in FIGS. 13A to 13D FIG. 13A, each soft magnetic material segment 14 covering the both surfaces of the permanent magnet 13 is provided with projections 61, recessed portions 62, the projections and recessed portions 63, and the side surface 64 with the continuously widened cross section similar to those in FIGS. 6A to 6D. The advantages obtained with these arrangements are the same as those described in the first embodiment.

Figure 14:
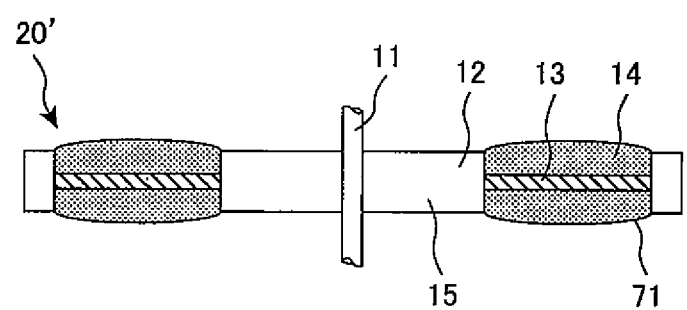
FIG. 14 is a longitudinal sectional view showing still another example of the rotor in the second embodiment.

In the example shown in FIG. 14, the soft magnetic material segment 14 is provided with the convex surface 71 for cogging torque suppression similar to that in FIG. 7 toward the respectively opposite stator sides. The advantages obtained with the convex surface are the same as those described in the first embodiment.

What is claimed is:

1. A rotor used for an axial gap permanent magnet motor in which a stator and the rotor are oppositely arranged having a gap between the stator and the rotor in a direction parallel to a rotary shaft, comprising:
    a plurality of permanent magnets that are magnetized in a rotary shaft direction respectively and arranged along a circumferential direction of the rotary shaft to form field magnetic poles;
    a plurality of soft magnetic material segments each of which is provided so as to cover at least a stator-facing surface in each of the permanent magnets to form a permanent magnet/soft magnetic material composite part including the permanent magnet and the soft magnetic material segment; and
    a disc-shaped nonmagnetic molded frame that is molded so as to cover a periphery of the permanent magnet/soft magnetic material composite parts while leaving at least the stator-facing surfaces of the soft magnetic material segments as exposed surfaces,
    wherein the permanent magnet/soft magnetic material composite parts are integrated with the disc-shaped nonmagnetic molded frame by molding of the disc-shaped nonmagnetic molded frame,
    wherein side surfaces of each of the soft magnetic material segments are provided with at least one of a projection engaged with the nonmagnetic molded frame or a recessed portion engaged with a part of the nonmagnetic molded frame,
    wherein the at least of a projection is provided along the circumferential direction of the soft magnetic material segment and doesn't contact with the permanent magnet.

2. A rotor used for an axial gap permanent magnet motor in which a stator and the rotor are oppositely arranged having a gap between the stator and the rotor in a direction parallel to a rotary shaft, comprising:

a plurality of permanent magnets that are magnetized in a rotary shaft direction respectively and arranged along a circumferential direction of the rotary shaft to form field magnetic poles;

a plurality of soft magnetic material segments each of which is provided so as to cover at least a stator-facing surface in each of the permanent magnets to form a permanent magnet/soft magnetic material composite part including the permanent magnet and the soft magnetic material segment; and a disc-shaped nonmagnetic molded frame that is molded so as to cover a periphery of the permanent magnet/soft magnetic material composite parts while leaving at least the stator-facing surfaces of the soft magnetic material segments as exposed surfaces, wherein the permanent magnet/soft magnetic material composite parts are integrated with the disc-shaped nonmagnetic molded frame by molding of the disc-shaped nonmagnetic molded frame, wherein the materials of the permanent magnets, the soft magnetic material segments and the nonmagnetic molded frame are powder materials respectively, and integrated by compaction molding.

3. The rotor according to claim 2, wherein side surfaces of each of the soft magnetic material segments are provided with at least one of a projection engaged with the nonmagnetic molded frame or a recessed portion engaged with a part of the nonmagnetic molded frame.

4. The rotor according to claim 2, wherein each of the soft magnetic material segments has a side surface steplikely or continuously widening from a side on the stator-facing surface as the exposed surface toward a side opposite to the stator-facing surface.

5. The rotor according to any one of claims 3 and 4, wherein the stator-facing surface of each of the soft magnetic material segments has a convex surface toward the stator side.

6. The rotor according to any one of claims 3 to 5, wherein each of the soft magnetic material segments is formed with a powder magnetic core.

7. The rotor according to any one of claims 3 to 5, wherein materials of the soft magnetic material segments and the permanent magnets are powder materials and these materials are compaction-molded such that each soft magnetic material segment and each permanent magnet integrally are laminated, or the soft magnetic material segment entirely covers the permanent magnet.

8. The rotor according to any one of claims 3 to 7, wherein the nonmagnetic molded frame is formed with synthetic resin or ceramic material.

9. The rotor according to any one of claims 3 to 7, wherein the nonmagnetic molded frame is formed with thermoplastic resin or thermohardening resin, and formed as an insert molded material by inserting the permanent magnet/soft magnetic material composite part in the resin.

10. An axial gap permanent magnet motor, wherein a stator and a rotor are oppositely arranged having a gap between the stator and the rotor in a direction parallel to a rotary shaft, and wherein the rotor is comprised of the rotor of any one of claims 3 to 9.

11. The axial gap permanent magnet motor according to claim 10, wherein the rotor is two, the two rotors are oppositely arranged in the direction parallel to the rotary shaft direction, and the stator is arranged between the rotors having a gap between the stator and each rotor.

12. The axial gap permanent magnet motor according to claim 10, wherein the stator is two, the two of stators are oppositely arranged in the direction parallel to the rotary shaft direction, and the rotor is arranged between the stators having a gap between the rotor and each stator.

13. A production method of a rotor used in the axial gap permanent magnet motor and the rotor used for an axial gap permanent magnet motor in which a stator and the rotor are oppositely arranged having a gap between the stator and the rotor in a direction parallel to a rotary shaft, comprising:

a plurality of permanent magnets that are magnetized in a rotary shaft direction respectively and arranged along a circumferential direction of the rotary shaft to form field magnetic poles;

a plurality of soft magnetic material segments each of which is provided so as to cover at least a stator-facing surface in each of the permanent magnets to form a permanent magnet/soft magnetic material composite part including the permanent magnet and the soft magnetic material segment; and a disc-shaped nonmagnetic molded frame that is molded so as to cover a periphery of the permanent magnet/soft magnetic material composite parts while leaving at least the stator-facing surfaces of the soft magnetic material segments as exposed surfaces, wherein the permanent magnet/soft magnetic material composite parts are integrated with the disc-shaped nonmagnetic molded frame by molding of the disc-shaped nonmagnetic molded frame, wherein the production method of the rotor comprising the steps of:

using magnet powder as material of the permanent magnets, powder as a powder magnetic core material to be the soft magnetic material segments and resin or ceramic nonmagnetic powder as material of the nonmagnetic molded frame, the method comprises:

a temporarily molding step of separately molding each of the permanent magnets, each of the soft magnetic material segments, and the nonmagnetic molded frame by applying respective compaction molding to the magnet powder, the powder as the powder magnetic core material and the nonmagnetic powder at pressure lower than that in a full-scale molding; and a full-scale molding step of engaging or laminating the temporarily molded permanent magnet and the soft magnetic material segment, and integrating these permanent magnet and soft magnetic material segment with the temporarily molded nonmagnetic molded frame by the full-scale compaction molding.

14. A rotor used for an axial gap permanent magnet motor in which a stator and the rotor are oppositely arranged having a gap between the stator and the rotor in a direction parallel to a rotary shaft, comprising:

a plurality of permanent magnets that are magnetized in a rotary shaft direction respectively and arranged along a circumferential direction of the rotary shaft to form field magnetic poles;

a plurality of soft magnetic material segments each of which is provided so as to cover at least a stator-facing surface in each of the permanent magnets to form a permanent magnet/soft magnetic material composite part including the permanent magnet and the soft magnetic material segment; and a disc-shaped nonmagnetic molded frame that is molded so as to cover a periphery of the permanent magnet/soft magnetic material composite parts while leaving at least the stator-facing surfaces of the soft magnetic material segments as exposed surfaces, wherein the permanent magnet/soft magnetic material composite parts are integrated with the disc-shaped nonmagnetic molded frame by molding of the disc-shaped nonmagnetic molded frame, wherein each of the soft magnetic material segments has a side surface steplikely or continuously widening from a side on the stator-facing surface as the exposed surface toward a side opposite to the stator-facing surface, wherein the side surface is provided in the circumferential direction of the soft magnetic material segment and doesn't contact with the permanent magnet.

* * * * *